Figure 1:
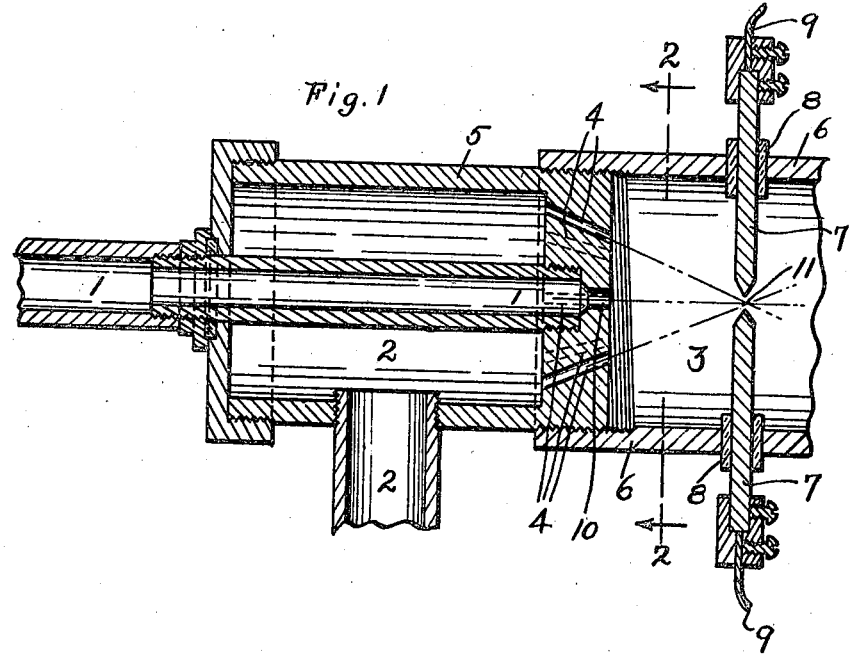

W. KOEHLER.
PROCESS AND APPARATUS FOR THE OXIDATION AND REDUCTION OF GASEOUS COMPOUNDS.
APPLICATION FILED OCT. 8, 1918.

1,332,730.  
Patented Mar. 2, 1920.

UNITED STATES PATENT OFFICE.

WILLIAM KOEHLER, OF CLEVELAND, OHIO.

PROCESS AND APPARATUS FOR THE OXIDATION AND REDUCTION OF GASEOUS COMPOUNDS.

1,332,730.	Specification of Letters Patent.	Patented Mar. 2, 1920.

Application filed October 8, 1918. Serial No. 257,413.

*To all whom it may concern:*

Be it known that I, WILLIAM KOEHLER, a citizen of the United States of America, residing at Cleveland, in the county of Cuyahoga and State of Ohio, have invented certain new and useful Processes and Apparatus for the Oxidation and Reduction of Gaseous Compounds; and I hereby declare the following to be a full, clear, and exact description of the invention, such as will enable others skilled in the art to which it pertains to make and use it.

This invention provides an apparatus for accomplishing the oxidation and reduction of gases or vapors which are subject to reaction by association under proper conditions. These conditions are as follows: The gases, no matter how many in number, must become thoroughly mixed; the temperature of the gases must be raised from normal operating temperatures to the reaction temperature, which is usually the ignition temperature of the mixture. These conditions must be produced simultaneously, that is, the temperature rise and the mixing of the gases must occur at one and the same time because any gases which are subject to an oxidation and reduction reaction by association are usually violently explosive and are extremely dangerous when mixed or associated at other than ignition temperature of the mixture. It is apparent, therefore, that this apparatus affords a means of associating such gases under proper reacting conditions and at the same time eliminates all danger from such reaction. This apparatus also permits of continuous operation and the complete recovery of all the products of oxidation and reduction.

Heretofore it has been attempted to produce reactions of oxidation and reduction by the association of various gases and the recovery of the products of the reaction by mixing the gases at one point and conducting them from that point to another point at which their temperature would be raised for reaction. During the conduction of the mixed gases from the point of mixture to the point of reaction irregularities of flow and irregularities of mixture due to eddying of the gaseous compounds are almost certain to result and under these circumstances spontaneous combustion from internal friction or the heat of combination of the gases is most likely to result in a violent and extremely dangerous explosion. There are only a few gases which are capable of an oxidation and reduction reaction under these circumstances of separate mixture and reaction points, whereas any gases, no matter how many in number, which are capable of oxidation and reduction by association can be oxidized and reduced and the products of said reaction can be recovered by apparatus embodying the principles of this invention.

While the illustrations show and the description will be applied to an apparatus for the oxidation and reduction of a controlled mixture of a gaseous carbon compound and a halogen thereby producing a halogen carbid in the presence of a halogen acid, I desire it to be understood that this invention is not limited thereto, this particular apparatus and this particular reaction being selected merely for purpose of illustration.

Figure 2:
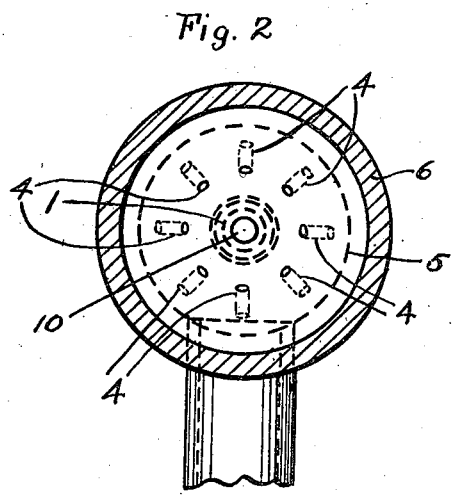

In the accompanying illustrations, Figure 1 represents a cross-section of an apparatus suitable for the production of halogen carbids and Fig. 2 represents a section of the same apparatus on the line 2—2 of Fig. 1.

In the accompanying illustrations, in which similar reference characters designate corresponding parts throughout the two views, 1 is a section of a chamber or conduit through which a carbon compound is passed in the direction of and through conduit or nozzle 10. 2 represents a chamber or conduit through which a halogen is passed in the direction of and through conduits or nozzles 4 in the casing 5 which incloses chamber 2. The conduits or nozzles 4 are so disposed with reference to conduit or nozzle 10 that the halogen passing from conduits or nozzles 4 completely envelops and mingles with the carbon compound passing from conduit or nozzle 10 and in such a manner that both the halogen and carbon compound are brought to a predetermined proportional mixture at and about the point 11. At and about this point 11, oxidation and reduction of the combined halogen and carbon compound takes place when this mixture or association of gases is raised in temperature to the ignition temperature of the mixture of gases.

Electrodes 7 represent a convenient method of heating the combined gases by means of the passage of an electric arc between the electrodes at the point 11. The primary object of this arc or other heating medium at the point 11 is to raise the temperature of the gaseous mixture. When the temperature of this mixture has been raised to ignition temperature the reaction oxidizing the carbon compound and reducing the halogen takes place.

An external casing 6 incloses the chamber 3 which conducts the products of oxidation and reduction to suitable apparatus for its use or for condensation and separation. Electrodes 7 are held in the casing 6 by means of the stuffing boxes 8 and said electrodes are connected to a source of current 9.

It is well known that whenever an oxidation takes place it must be accompanied by a corresponding reduction in order to complete the reaction and result in stable equilibrium. I use the term "oxidation" in relation to this invention and herein in a generic sense, and this invention is not limited to the use of oxygen or oxygen reactions, but it also includes halogen reactions, and the expression "oxidation and reduction" is intended to denote and apply to, and for the purposes of this invention it means, any reaction in which there is a combination or dissociation of a plurality of elements, or a reaction in which one or more elements or compounds in combination is oxidized.

Having thus described my invention, I claim:

1. The process for the oxidation and reduction of gaseous compounds, which consists in mixing various gases at a common point and raising the temperature of said mixture at said point, substantially as described.

2. The process for the oxidation and reduction of gaseous compounds, which consists in mixing various gases at a common point and heating said mixture of gases at said common point at the instant of mixing, substantially as described.

3. An apparatus for the oxidation and reduction of gaseous compounds, comprising a conduit for directing a gas, a plurality of nozzles for directing a gas to a common point in the flow from said conduit, and means for heating the mixture at said common point, substantially as described.

4. An apparatus for the oxidation and reduction of gaseous compounds, comprising a conduit for directing a gas, a plurality of nozzles arranged around the conduit, the nozzles converging for directing a gas to a common point in the flow from said conduit, and means for heating the mixture by an electric spark at said common point, substantially as described.

5. An apparatus for the oxidation and reduction of gaseous compounds, comprising a conduit for directing a gas, a chamber surrounding the conduit for receiving a gas, the chamber being provided with a plurality of nozzles, the nozzles being directed to a common point in the flow from said conduit, a casing for receiving the mixture from said conduit and said nozzles, and means for heating the mixture at said common point, substantially as described.

In testimony whereof I sign the foregoing specification in the presence of a witness.

WILLIAM KOEHLER.

Witness:
MORRIS F. LUFF.